United States Patent
Koichi

(10) Patent No.: US 7,440,808 B2
(45) Date of Patent: Oct. 21, 2008

(54) ELECTRONIC APPARATUS, REPLACEMENT UNIT, AND ELECTRONIC APPARATUS CONTROL METHOD

(75) Inventor: Hiroshi Koichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 11/360,608

(22) Filed: Feb. 24, 2006

(65) Prior Publication Data

US 2006/0204252 A1 Sep. 14, 2006

(30) Foreign Application Priority Data

Mar. 9, 2005 (JP) ............... 2005-065537
Mar. 16, 2005 (JP) ............... 2005-074674
Dec. 8, 2005 (JP) ............... 2005-355209

(51) Int. Cl.
G05B 13/02 (2006.01)
G03G 15/00 (2006.01)
G03G 15/02 (2006.01)

(52) U.S. Cl. ............... 700/52; 399/24; 399/31; 399/110

(58) Field of Classification Search ............... 700/32, 700/52; 399/24, 12, 80, 8, 13, 11, 25, 31, 399/90, 110, 119, 120, 77
See application file for complete search history.

(56) References Cited

U.S. PATENT DOCUMENTS 5,930,553 A * 7/1999 Hirst et al. ............... 399/8
6,094,548 A * 7/2000 Gunning et al. ............... 399/75
6,447,094 B1 * 9/2002 Berg et al. ............... 347/22
6,735,399 B2 * 5/2004 Tabb et al. ............... 399/8
6,807,388 B1 * 10/2004 Kojima et al. ............... 399/80
7,043,166 B2 * 5/2006 Parry et al. ............... 399/12
7,177,553 B2 * 2/2007 Ono ............... 399/12
2004/0126123 A1 * 7/2004 Koga et al. ............... 399/24
2005/0008376 A1 1/2005 Parry et al.

FOREIGN PATENT DOCUMENTS

| JP | 11-296325 | 10/1999 |
| JP | 2000-200187 | 7/2000 |
| JP | 2001-315323 | 11/2001 |
| JP | 2002-225307 | 8/2002 |
| JP | 2002-307717 | 10/2002 |
| JP | 2003-216375 | 7/2003 |
| JP | 2004-86032 | 3/2004 |
| JP | 2004-226921 | 8/2004 |

* cited by examiner

Primary Examiner—Thomas K Pham
(74) Attorney, Agent, or Firm—Oblon, Spivak, McClelland, Maier & Neustadt, P.C.

(57) ABSTRACT

An electronic apparatus holds identification information for identifying the electronic apparatus. A replacement unit is detachably connected to the electronic apparatus. The replacement unit holds an operation program to controls the electronic apparatus and determination information. When the replacement unit is connected to the electronic apparatus, it is determined based on the identification information and the determination information whether the operation program can control the electronic apparatus. Upon determining that the operation program can control the electronic apparatus, the electronic apparatus is controlled with the operation program.

9 Claims, 9 Drawing Sheets

ELECTRONIC APPARATUS, REPLACEMENT UNIT, AND ELECTRONIC APPARATUS CONTROL METHOD

CROSS-REFERENCE TO RELATED APPLICATIONS

The present document incorporates by reference the entire contents of Japanese priority documents, 2005-065537 filed in Japan on Mar. 9, 2005, 2005-074674 filed in Japan on Mar. 16, 2005 and 2005-355209 filed in Japan on Dec. 8, 2005.

BACKGROUND OF THE INVENTION

1. Field of the Invention

The present invention relates to a replacement unit used in an electronic apparatus, and, more particularly, to a replacement unit that can store an operation program that controls an electronic apparatus.

2. Description of the Related Art

Conventionally, firmware that is executed by a printer apparatus is upgraded to deal with problems on functions already installed. When upgrading the firmware, a service engineer updates the firmware of the printer apparatus by downloading updated firmware directly to the printer apparatus over a network, or transferring the updated firmware to the printer apparatus from an external medium.

For example, Japanese Patent Application Laid-open (JP-A) No. 2000-200187 proposes a technique of automatically updating firmware via a network. The firmware is downloaded via the network in response to version-upgrade information sent from a management server. Accordingly, the firmware can be kept updated to the latest version.

However, automatically downloading of the firmware can create issues if, for example, expendable items or the like connected to the image forming apparatus are not compatible with the updated firmware. That is, in the conventional technique it is difficult to determine appropriate firmware according to the status of the image forming apparatus and update the installed firmware to the appropriate one.

SUMMARY OF THE INVENTION

It is an object of the present invention to at least solve the problems in the conventional technology.

According to an aspect of the present invention, an electronic apparatus includes an apparatus-side storage unit that stores therein identification information for identifying the electronic apparatus; and a connector connectable to a replacement unit, the replacement unit having a unit-side storage unit that stores therein an operation program to controls the electronic apparatus, and determination information that is a basis of determining whether the operation program can control the electronic apparatus based on the identification information stored in the apparatus-side storage unit.

According to another aspect of the present invention, a replacement unit includes a connector connectable to an electronic apparatus, the electronic apparatus having an apparatus-side storage unit that stores therein identification information for identifying the electronic apparatus; and a unit-side storage unit that stores therein an operation program to controls the electronic apparatus, and determination information that is a basis of determining whether the operation program can control the electronic apparatus based on the identification information stored in the apparatus-side storage unit.

According to still another aspect of the present invention, a method of controlling an electronic apparatus with a replacement unit that can be detachably attached to the electronic apparatus, the electronic apparatus including an apparatus-side storage unit that stores therein identification information for identifying the electronic apparatus; and a first connector connectable to the replacement unit, and the replacement unit including a second connector connectable to the first connector of the electronic apparatus; and a unit-side storage unit that stores therein an operation program to controls the electronic apparatus; and determination information that is a basis of determining whether the operation program can control the electronic apparatus based on the identification information stored in the apparatus-side storage unit, the method comprising reading the identification information from the apparatus-side storage unit; determining based on read identification information and the determination information in the unit-side storage unit whether the operation program in the unit-side storage unit can control the electronic apparatus; and executing the operation program in the unit-side storage unit when it is determined at the determining that the operation program can control the electronic apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings.

Figure 1:
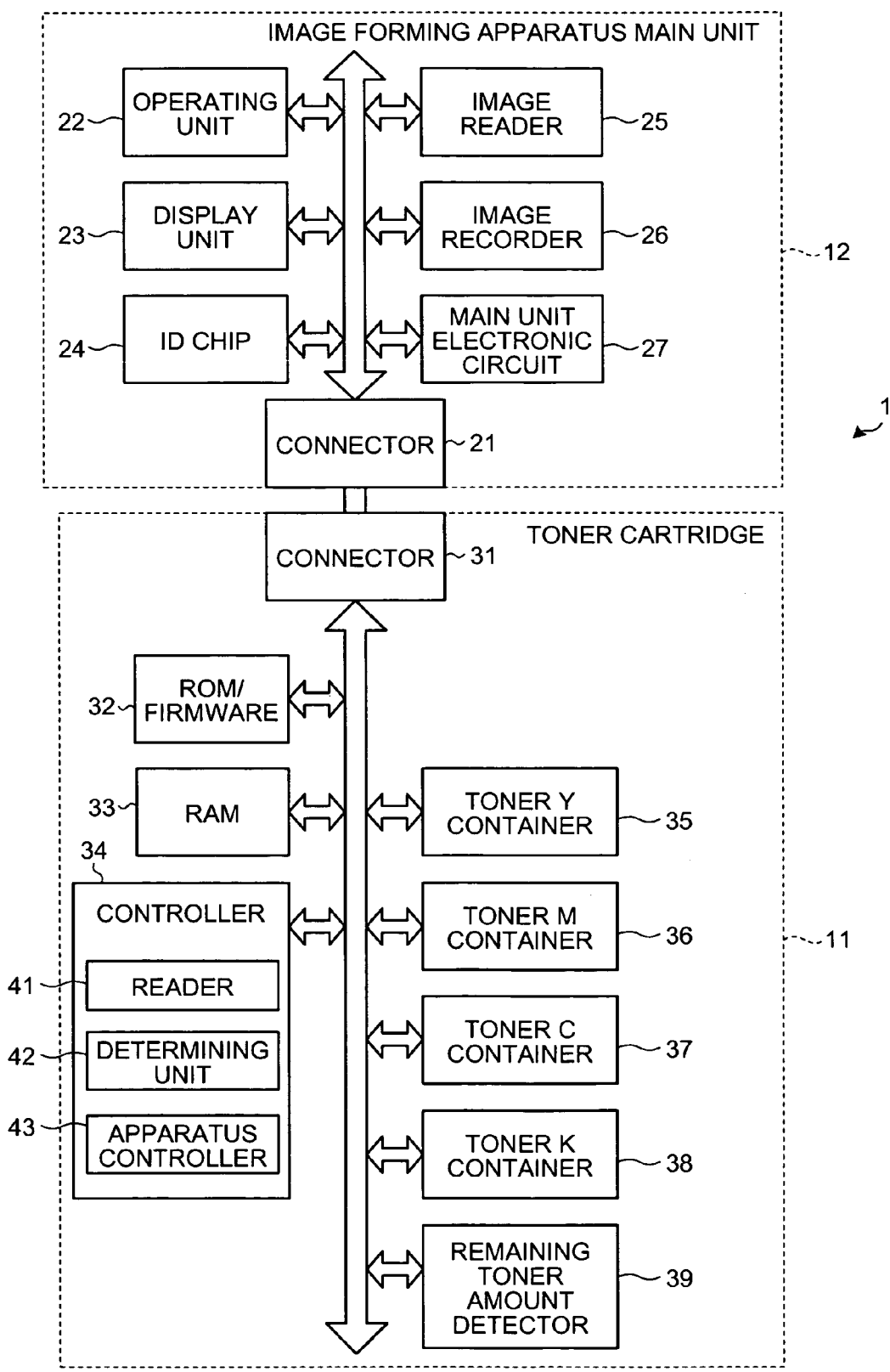
FIG. 1 is a block diagram of an image forming apparatus according to a first embodiment of the present invention.

FIG. 1 is a block diagram of an image forming apparatus according to a first embodiment of the present invention. As shown in FIG. 1, the image forming apparatus 1 includes an image forming apparatus main unit 12, and a toner cartridge 11 containing toners of four colors. The toner cartridge 11 is attachable to the image forming apparatus main unit 12.

The image forming apparatus main unit 12 includes a connector 21, an operating unit 22, a display unit 23, an ID chip 24, an image reader 25, an image recorder 26, and a main unit electronic circuit 27.

The connector 21 connects to the toner cartridge 11 to perform transmission and reception of information between the image forming apparatus main unit 12 and the toner cartridge 11.

The operating unit 22 has various operation keys, and accepts various operations performed by an operator. The display unit 23 displays an operation method of the image forming apparatus 1 and the operation status thereof on an operation panel, and displays notification contents to the user.

The ID chip 24 stores information to identify the image forming apparatus main unit 12. According to the first embodiment, the ID chip 24 holds a main unit ID to identify the image forming apparatus main unit 12 and a type ID to identify the type of the image forming apparatus. A controller 34 (explained later) in the toner cartridge 11 verifies the image forming apparatus using the main unit ID and the type ID in the ID chip 24. Specific verification procedures will be explained later.

The main unit ID is to be a unique ID given to each image forming apparatus main unit 12. The type ID is to be an ID to identify the type of the image forming apparatus main unit 12.

Conventionally, an image forming apparatus has firmware and a controller. That is, a toner cartridge does not need to identify an image forming apparatus. The image forming apparatus rather needs to determine whether a toner cartridge is connectable. Conventionally, therefore, an ID chip is provided on the toner cartridge.

According to the first embodiment, however, firmware is provided on a toner cartridge. This makes it necessary for the toner cartridge to identify the image forming apparatus, so that the image forming apparatus has the ID chip.

The image reader 25 reads document image, and outputs image information. The image recorder 26 prints image information on a recording medium. The main unit electronic circuit 27 is an auxiliary circuit for operating the image forming apparatus main unit 12.

The toner cartridge 11 has a connector 31, a ROM 32, a random access memory (RAM) 33, the controller 34, a toner Y (yellow) container 35, a toner M (magenta) container 36, a toner C (cyan) container 37, a toner K (black) container 38, and a remaining toner amount detector 39. The controller 34 activates firmware stored in the ROM 32 and controls the operation of the image forming apparatus 1.

According to the first embodiment, replacing the toner cartridge to be installed in a common image forming apparatus main unit can change the functional specifications of the image forming apparatus. This is achieved by providing a difference in the operation program (e.g., firmware) in the ROM 32, or differences in the capacities and specifications of the ROM 32 and the RAM 33 toner cartridge by toner cartridge. Details will be explained later. Alternatively, the operation program can have a correlation with the types of toners contained, and the operation program can be changed according to a difference in the type of the toner.

The connector 31 connects to the image forming apparatus main unit 12 to perform transmission and reception of information between the toner cartridge 11 and the image forming apparatus main unit 12.

A program for operating the image forming apparatus 1 is stored beforehand in the ROM 32 in the toner cartridge 11. According to the first embodiment, firmware that is used to control the image forming apparatus 1 is stored as the program for operating the image forming apparatus 1. The ROM 32 can be expanded by memory extension or the like in the toner cartridge 11.

The ROM 32 also stores table information that correlates the type ID stored in the image forming apparatus main unit 12 with device-type dependent units of the firmware. Referring to the table information, it is possible to determine whether the firmware stored in the ROM 32 can control the image forming apparatus main unit 12. The information based on which the determination is made is not limited to the table information, but any information that can specify the device-type dependent units of the firmware based on the information stored in the image forming apparatus main unit 12.

Figure 2:
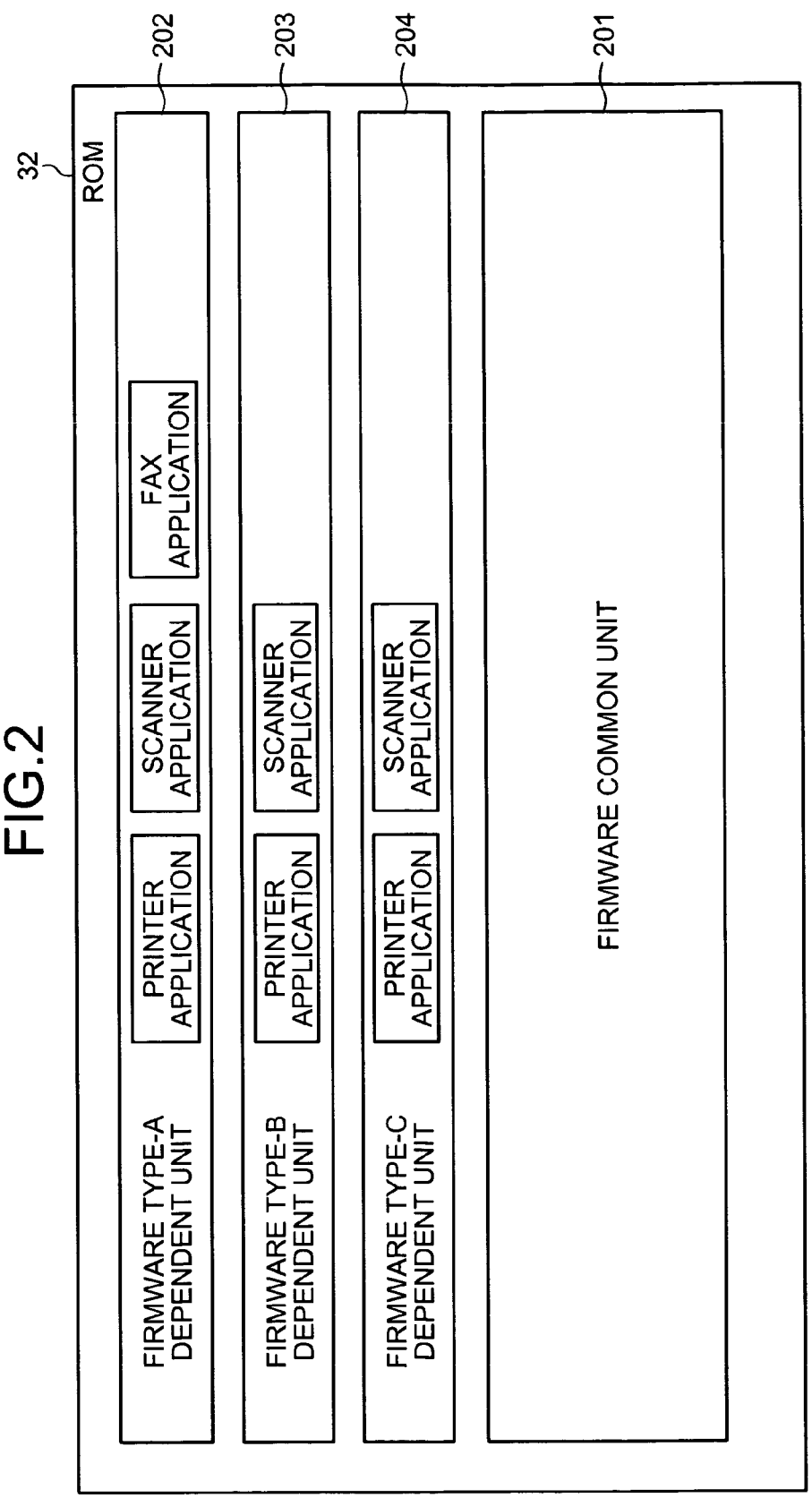
FIG. 2 is a schematic for explaining one example of firmware stored in a read only memory (ROM) shown in FIG. 1.

FIG. 2 is a schematic for explaining one example of firmware stored in the ROM 32. The ROM 32 includes a firmware common unit 201, a firmware type-A dependent unit 202, a firmware type-B dependent unit 203, and a firmware type-C dependent unit 204. This configuration can activate appropriate firmware for the image forming apparatus when the toner cartridge 11 is connected to the image forming apparatus main unit 12. The table information that represents the correlation between the type ID and the device-type dependent units of the firmware is not shown in FIG. 2. Process procedures up to the activation of the appropriate firmware that matches the device type will be explained later.

Since the firmware is separated into device-type dependent units, application for each different type can be provided. As shown in FIG. 2, the firmware type-A dependent unit 202 stores therein a printer application, a scanner application, and a FAX application. Each of the firmware type-B dependent unit 203 and the firmware type-C dependent unit 204 stores therein a printer application and a scanner application.

When different functions are installed for different types of the image forming apparatus, the toner cartridge 11 stores firmware that includes an appropriate application for different types of the image forming apparatus. Accordingly, the toner cartridge 11 can provide optimal firmware for each type of the image forming apparatus.

According to the first embodiment, replacing the toner cartridge 11 provides the same type of image forming apparatus with different type of firmware. One feasible example of this case is version-upgrade of firmware.

Firmware can be upgraded to eliminate problems that occur due to functional expansion of the image forming apparatus 1 after a user is provided with the image forming apparatus 1. Conventionally, the firmware upgrade is performed as a service engineer transfers the latest firmware over a network or from an external medium. Upgrading the firmware of the image forming apparatus or the like according to expendable items is often performed via a communication network, such as the Internet.

In this case, the work load of the service engineer becomes large if the service engineer needs to upgrade firmware of the entire image forming apparatuses he/she is in charge. Some image forming apparatuses or the like in use may not be connected to a communication network, and it is difficult to upgrade the firmware.

On the other hand, according to the first embodiment, replacing the toner cartridge can upgrade the firmware, so that the user can upgrade the firmware even without recognizing the upgrade. The upgrading procedures according to the first embodiment can achieve easy upgrade of the firmware without, for example, downloading the latest version of firmware over a communication network.

The version of the firmware with which a replacement part is compatible needs to be matched with the version of the actual firmware of the image forming apparatus. Conventionally, therefore, a user or a service engineer needs to check the version of the firmware with which a replacement part is compatible when the firmware is to be upgraded. However, according to the first embodiment, as the firmware is stored in a replacement part, such as a toner cartridge, the version of the firmware with which the replacement part is compatible can be matched with the actual firmware of the image forming apparatus even without the user's recognition of the upgrade.

Since a replacement part, such as a toner cartridge, stores firmware, the firmware is changed every time the replacement part is replaced. This makes the firmware of the image forming apparatus 1 to be the latest version every time the toner cartridge is replaced.

A plurality of toner cartridges respectively storing different firmware can be prepared, so that different application is executed when a toner cartridge for the same type of image forming apparatus is replaced with another one.

Figure 3:
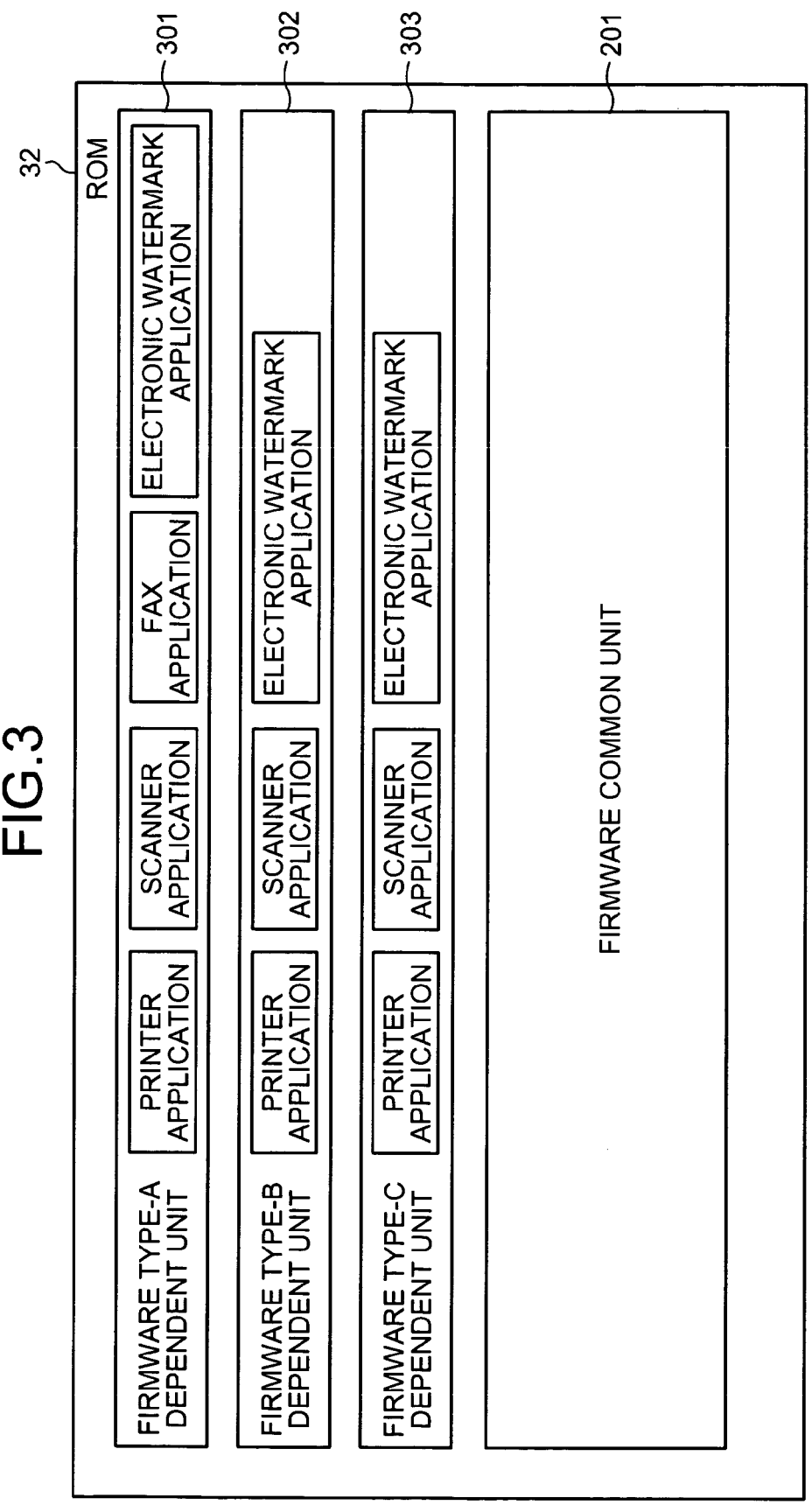
FIG. 3 is a schematic for explaining another example of firmware stored in a read only memory (ROM) shown in FIG. 1.

FIG. 3 is a schematic to explain another example of firmware stored in the ROM 32. As shown in FIG. 3, the firmware stored in the ROM 32 differs from the firmware shown in FIG. 2 in that the firmware in FIG. 3 has different applications in the device-type dependent units. Specifically, an electronic watermark application is further stored in each of a firmware type-A dependent unit 301, a firmware type-B dependent unit 302, and a firmware type-C dependent unit 303.

According to the first embodiment, therefore, with the toner cartridge 11 being replaced, the image forming apparatus 1 can provide a user with different functions.

As a specific example, when a user requests to embed an electronic watermark when printing, the toner cartridge connected to the image forming apparatus 1 has only to be changed to a toner cartridge that has the electronic watermark application. This configuration can easily fulfill a user's request of adding a function.

The provision of different firmware for different toner cartridges is not limited to the one of a different application, but any part of the firmware can be modified, such as changing a layout to be displayed on the operation panel. Accordingly, a user's request on the image forming apparatus 1 can be achieved simply by replacing the toner cartridge.

Referring back to FIG. 1, the RAM 33 stores various kinds of information specific to the image forming apparatus 1 and optimal set values in the image forming apparatus main unit 12. The RAM 33 is also used as a memory area needed when the controller 34 (explained later) executes predetermined operations.

Also, the RAM 33 can be expanded by memory extension or the like in the toner cartridge 11. The size of the memory area of the RAM 33 can be changed for each toner cartridge 11. Accordingly, it is possible to secure a memory area of the appropriate size according to, for example, the firmware executed by the controller 34.

The RAM 33 that stores various kinds of readable and writable information is provided in an extendible manner in the toner cartridge 11 that is attachable to the image forming apparatus main unit 12. Accordingly, the functional specifications of an electronic device can be changed by the toner cartridge 11 to be attached, and the cost of the image forming apparatus main unit 12 can be reduced.

The controller 34 includes a central processing unit (CPU) (not shown). Since the CPU executes the firmware common unit 201 stored in the ROM 32, the configuration that includes a reader 41, a determining unit 42, and an apparatus controller 43 is realized. By further executing a device-type dependent unit of the firmware, the controller 34 can control each section of the image forming apparatus 1 to execute predetermined operations.

The reader 41 reads the main unit ID and the type ID from the ID chip 24 of the image forming apparatus main unit 12 when the image forming apparatus main unit 12 is connected to the connector 31.

Based on the main unit ID and the type ID read by the reader 41, the determining unit 42 determines whether the image forming apparatus main unit 12 is controllable when a device-type dependent unit of the firmware stored in the ROM 32 is executed.

In the first embodiment, the determining unit 42 first determines whether the main unit ID is a normal ID. When having determined that the main unit ID is a normal ID, the determining unit 42 determines whether a device-type dependent unit of the firmware that corresponds to the type ID is stored in the ROM 32 by referring to the table information stored in the ROM 32.

When having determined that a device-type dependent unit of the firmware that corresponds to the type ID is stored in the ROM 32, the determining unit 42 determines that the image forming apparatus main unit 12 is controllable as the device-type dependent unit of the firmware is executed.

When the determining unit 42 determines that the image forming apparatus main unit 12 is controllable, the apparatus controller 43 executes the device-type dependent unit of the firmware. The apparatus controller 43 then controls the image forming apparatus main unit 12 with the executed firmware.

The toner Y container 35 contains a yellow toner, and the container is replaced when the toner is finished. The toner M container 36 contains a magenta toner, and the container is replaced when the toner is finished. The toner C container 37 contains a cyan toner, and the container is replaced when the toner is finished. The toner K container 38 contains a black toner, and the container is replaced when the toner is finished. The remaining toner amount detector 39 detects the amount of toner remaining in each toner container color by color.

When the operation program in the toner cartridge 11 does not match the image forming apparatus 1, the image forming apparatus 1 can notify it to the user. Accordingly, the user can notice it and can promptly deal with the situation. The notification can be made by displaying, for example, a notification message on the display unit 23.

When the operation program in the toner cartridge (apparatus unit) does not match the image forming apparatus 1, a request to upgrade the operation program is notified to the user to prevent such an operation program incompatible with the image forming apparatus 1 from being executed.

When such a notification is made, an upgrade method can be also notified. Since the upgrade method is notified to the user, the user can prevent the operation program incompatible with the image forming apparatus 1 from being executed by the method.

Figure 4:
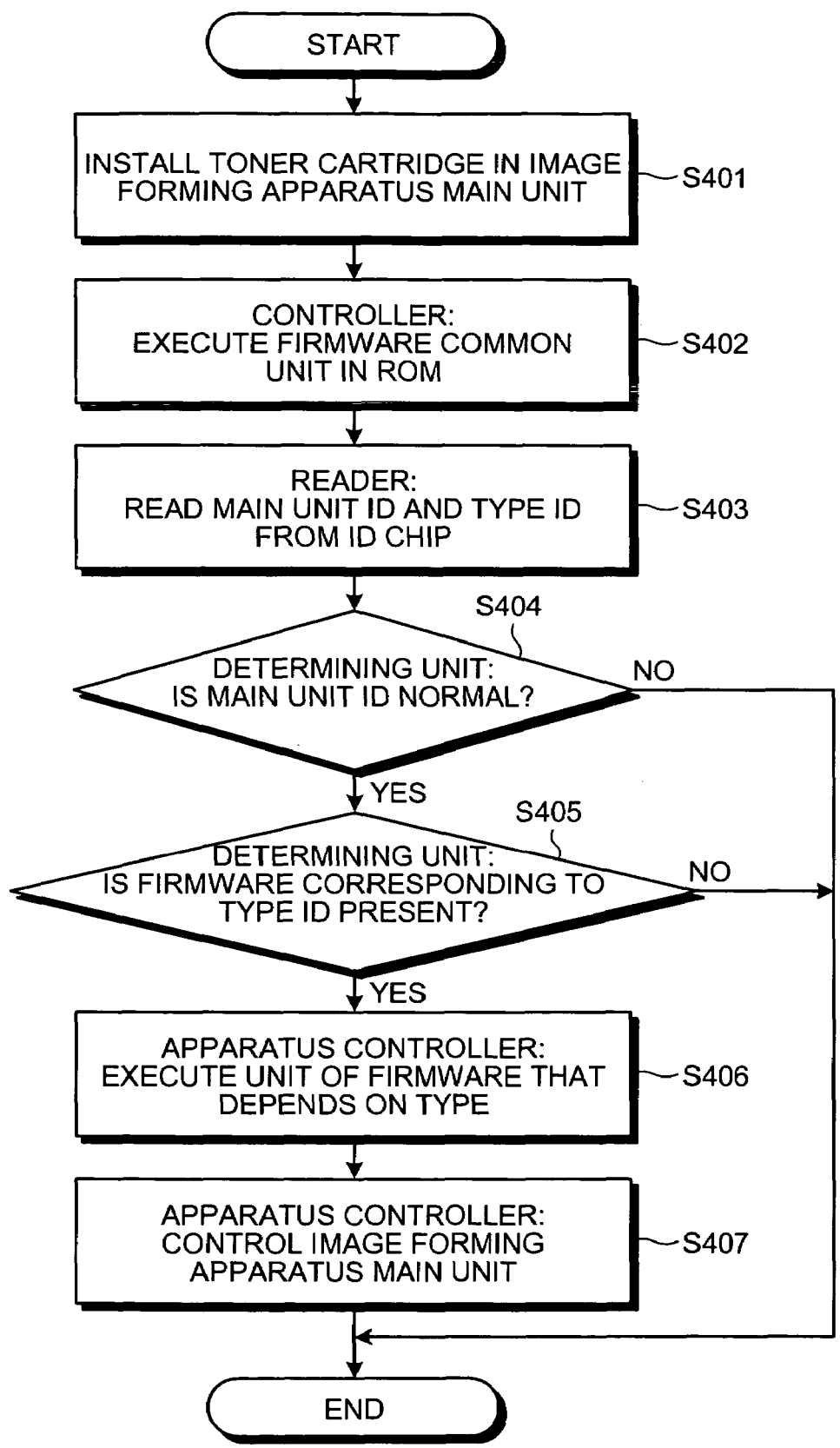
FIG. 4 is a flowchart of a processing procedure for explaining connection of the toner cartridge to the image forming apparatus according to the first embodiment to execution of control of a main unit of the image forming apparatus.

The following will describe a process from connection of the toner cartridge 11 to the image forming apparatus main unit 12 by the user to execution of control of the image forming apparatus main unit 12. FIG. 4 is a flowchart of process procedures of the image forming apparatus 1.

First, the user installs the toner cartridge 11 in the image forming apparatus main unit 12 (step S401).

The controller 34 of the toner cartridge 11 then executes the firmware common unit 201 stored in the ROM 32 (step S402). Accordingly, the configuration that includes the reader 41, the determining unit 42, and the apparatus controller 43 is realized in the controller 34.

The reader 41 reads the main unit ID and the type ID from the ID chip 24 of the image forming apparatus main unit 12 via the connector 31 (step S403).

The determining unit 42 then determines whether the read main unit ID is a normal ID (step S404). When having determined that the read main unit ID is not a normal ID (step S404: No), the determining unit 42 determines that there is no correlation between the toner cartridge and the main unit of the image forming apparatus, and terminates the process.

When having determined that the read main unit ID is a normal ID (step S404: Yes), the determining unit 42 further determines whether a device-type dependent unit of the firmware that corresponds to the type ID is present in the ROM 32 by referring to the table information in the ROM 32 (step S405). When having determined that no device-type dependent unit of the firmware that corresponds to the type ID is present in the ROM 32 (step S405: No), the determining unit 42 determines that the image forming apparatus main unit 12 is not controllable, and terminates the process.

When the determining unit 42 determines that a device-type dependent unit of the firmware that corresponds to the type ID is present in the ROM 32 (step S405: Yes), the apparatus controller 43 executes the device-type dependent unit of the firmware that corresponds to the type ID (step S406). For example, when the determining unit 42 determines that the image forming apparatus main unit 12 is a type A, the apparatus controller 43 executes the firmware type-A dependent unit 202 in the ROM 32 in FIG. 2.

The apparatus controller 43 controls the image forming apparatus main unit 12 with the executed firmware (step S407).

Through the process procedures, the image forming apparatus main unit 12 can be controlled by the firmware stored in the ROM 32 in the toner cartridge 11.

The identification information stored in the image forming apparatus main unit 12 is not limited to the main unit ID specific to each image forming apparatus main unit 12, but can be any information that identifies the image forming apparatus main unit 12. For example, the identification information can be information that identifies the type of the image forming apparatus main unit 12. In this case, it is also possible to verify the type or the like of the image forming apparatus main unit 12, and determine whether the image forming apparatus main unit 12 is controllable with the firmware using the result of the verification.

According to the first embodiment, the firmware of the image forming apparatus 1 can easily be updated to an appropriate one by replacing the toner cartridge 11.

Since the image forming apparatus 1 has an expendable-item containing apparatus unit (toner cartridge) attachable to the main unit of the image forming apparatus 1, and the memory storing the operation program (firmware) of the electronic device is located in the apparatus unit, the main unit of the image forming apparatus 1 does not need a memory storing the operation program, and the functional specifications of the electronic device can be changed by an apparatus unit to be attached.

Since the main unit of the image forming apparatus 1 does not have a memory storing the operation program of the electronic device, it is possible to change the functional specifications of the electronic device using an apparatus unit to be attached, and reduce the cost of the main unit of the image forming apparatus.

Since the controller that controls the main unit of the image forming apparatus 1 is located in the expendable-item containing apparatus unit that is attachable to the main unit of the image forming apparatus 1, it is possible to change the functional specifications of the electronic device using an apparatus unit to be attached, and reduce the cost of the main unit of the image forming apparatus.

Since the image forming apparatus main unit has the ID chip 24 that records the information of the main unit of the image forming apparatus, the controller can detect the information of the main unit of the image forming apparatus even if the apparatus unit is replaced, and can perform optimal control according to the status of the main unit of the apparatus.

Based on the information in the ID chip provided in the main unit of the image forming apparatus 1, the controller in the apparatus unit selects an optimal operation program that matches the status of the main unit of the apparatus. Accordingly, it is possible to execute optimal control matching the status of the main unit of the image forming apparatus.

Based on the information in the ID chip provided in the main unit of the image forming apparatus 1, the controller in the apparatus unit selects optimal set values that match the status of the main unit of the apparatus. Accordingly, it is possible to execute optimal control matching the status of the main unit of the image forming apparatus.

Since replacement of the apparatus unit provides the image forming apparatus according to the first embodiment with different functional specifications, the image forming apparatus is advantageous in easy upgrade of the functions and the version of the electronic device, and easy model change.

According to the first embodiment, a toner cartridge is used as an apparatus unit. Accordingly, a toner is an expendable item, so that the image forming apparatus can be upgraded to the latest version or the functions can be upgraded when the toner cartridge is replaced due to the toner being finished.

According to the first embodiment, the operation program of the main unit of the image forming apparatus is incorporated in the toner cartridge containing an expendable item, so that control of the apparatus main unit corresponding to the expendable item is always executed according to the expendable item to be used (e.g., toner), and the status of the apparatus main unit is detected to perform optimal control of the apparatus main unit. This can perform upgrade of the functions of the apparatus, improvement of the quality, and improvement of the convenience. In addition, the program of the apparatus main unit can be upgraded by replacement of the toner cartridge.

The toner cartridge includes containers containing toners of respective colors. To replace a toner, therefore, the container containing that toner has only to be replaced without requiring replacement of the toner cartridge, which is economical.

Since toners can be replaced color by color, a color toner that is finished has only to be replaced, which is economical.

Since there is the unit that detects remaining amounts of toners of each color, it is possible to know which color toner is becoming less in the cartridge.

When there is a color toner becoming less, the user is notified of it, and can therefore know which color toner is becoming less.

When there is a color toner becoming less, a service provider is notified of it, and replenishment of the color toner is appropriately performed by the service provider.

In the first embodiment, firmware is stored in the ROM 32 in the toner cartridge 11. In this case, the toner cartridge does not have any external interface, and no information can be written in the ROM 32, so that the firmware installed in the toner cartridge cannot be changed. The firmware installed in the toner cartridge can be configured so as to be changeable.

According to a second embodiment of the present invention, firmware installed in the toner cartridge is made changeable.

Figure 5:
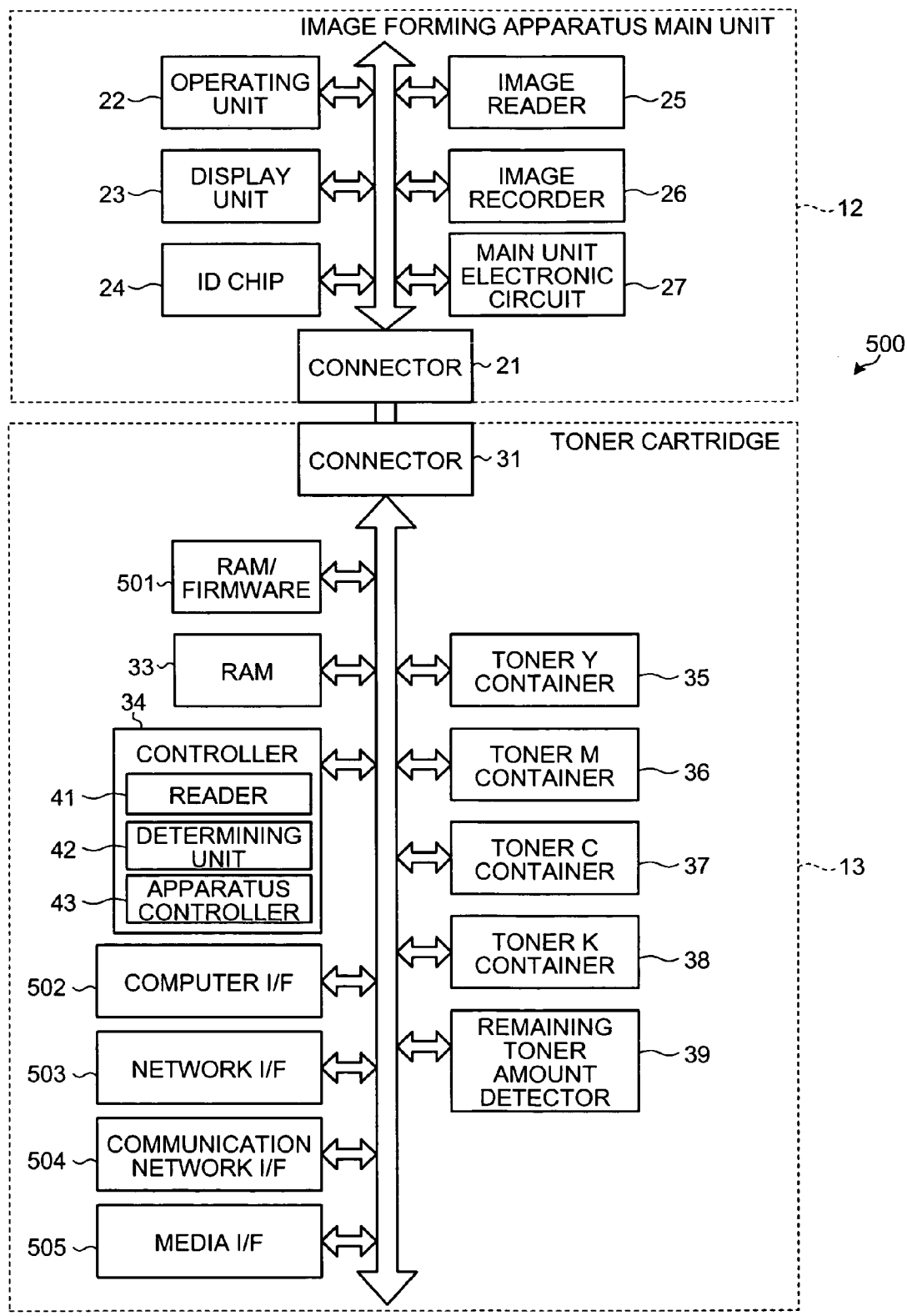
FIG. 5 is a block diagram of an image forming apparatus according to a second embodiment of the present invention.

FIG. 5 is a block diagram of an image forming apparatus according to the second embodiment. An image forming apparatus 500 includes the image forming apparatus main unit 12, and a toner cartridge 13 that contains toners of four colors and an external interface. The toner cartridge 13 is attachable to the image forming apparatus main unit 12. The same reference numerals have been attached to the structural elements in the first embodiment and the second embodiment that perform the same or similar functions or have the same or similar structure.

The toner cartridge 13 differs from the toner cartridge 11 in that a RAM 501 is provided instead of the ROM 32, and a computer interface (I/F) 502, a network I/F 503, a communication network I/F 504, and a media I/F 505 are further provided.

In the same manner as the ROM 32, the RAM 501 stores firmware that is used to control the image forming apparatus. The firmware stored in the RAM 501 can be rewritten from an external interface, such as the computer I/F 502 or the like (explained later). Because the RAM 501 is the same as the ROM 32 in aspects other than the rewritable function, redundant explanation of the RAM 501 will be omitted.

The computer I/F 502 connects to an external computer via a universal serial bus (USB) or the like, and downloads a program from the external computer.

The network I/F 503 connects the image forming apparatus to a network (not shown), such as a local area network (LAN), and performs communications with a service provider over the network and downloading of a program over the network.

The communication network I/F 504 connects the image forming apparatus to a telephone network. Accordingly, the communication network I/F 504 performs communications with a service provider over the telephone network and downloading of a program over the telephone network.

The media I/F 505 connects to a medium, such as a secure digital card (SD card) or a CD-recordable (CD-R), and downloads a program from the external medium.

The firmware stored in the RAM 501 can be updated by download of a program executed by the computer I/F 502, the network I/F 503, the communication network I/F 504, and the media I/F 505.

The toner cartridge 13 does not need to have all of the interfaces, but should have at least one of the interfaces. The external interfaces are not limited to those mentioned, but any interface that can perform external communications can be used.

The provision of the external interfaces in the toner cartridge 13 can always provide a user with the latest version of firmware as the one in the toner cartridge 13 before shipment from a factory is updated.

A service engineer can visit a user and update the firmware in the toner cartridge 13 in use. Accordingly, it is possible to deal with problems in the firmware that need to be promptly attended when they are found.

The apparatus unit has the communication unit and notifies the information of the main unit of the image forming apparatus, and setting information to a service provider. Accordingly, this configuration is very useful for maintenance of electronic devices, and can keep a high quality.

Since the image forming apparatus has the unit that uses the communication unit of the apparatus unit to upgrade the operation program in the apparatus unit, the image forming apparatus is easy to operate and useful.

Since the image forming apparatus has interface units in communication with various kinds of media in the apparatus unit, and has the unit that upgrades the operation program in the apparatus unit by using the various kinds of media, the image forming apparatus is easy to operate and useful.

Since the image forming apparatus has the unit that writes various kinds of information stored in the memory in the apparatus unit into various kinds of media, upload of information into the electronic device is easily executed. The image forming apparatus is therefore easy to operate and useful.

According to a third embodiment of the present invention to be explained below, the controller is provided in the main unit of the image forming apparatus.

Figure 6:
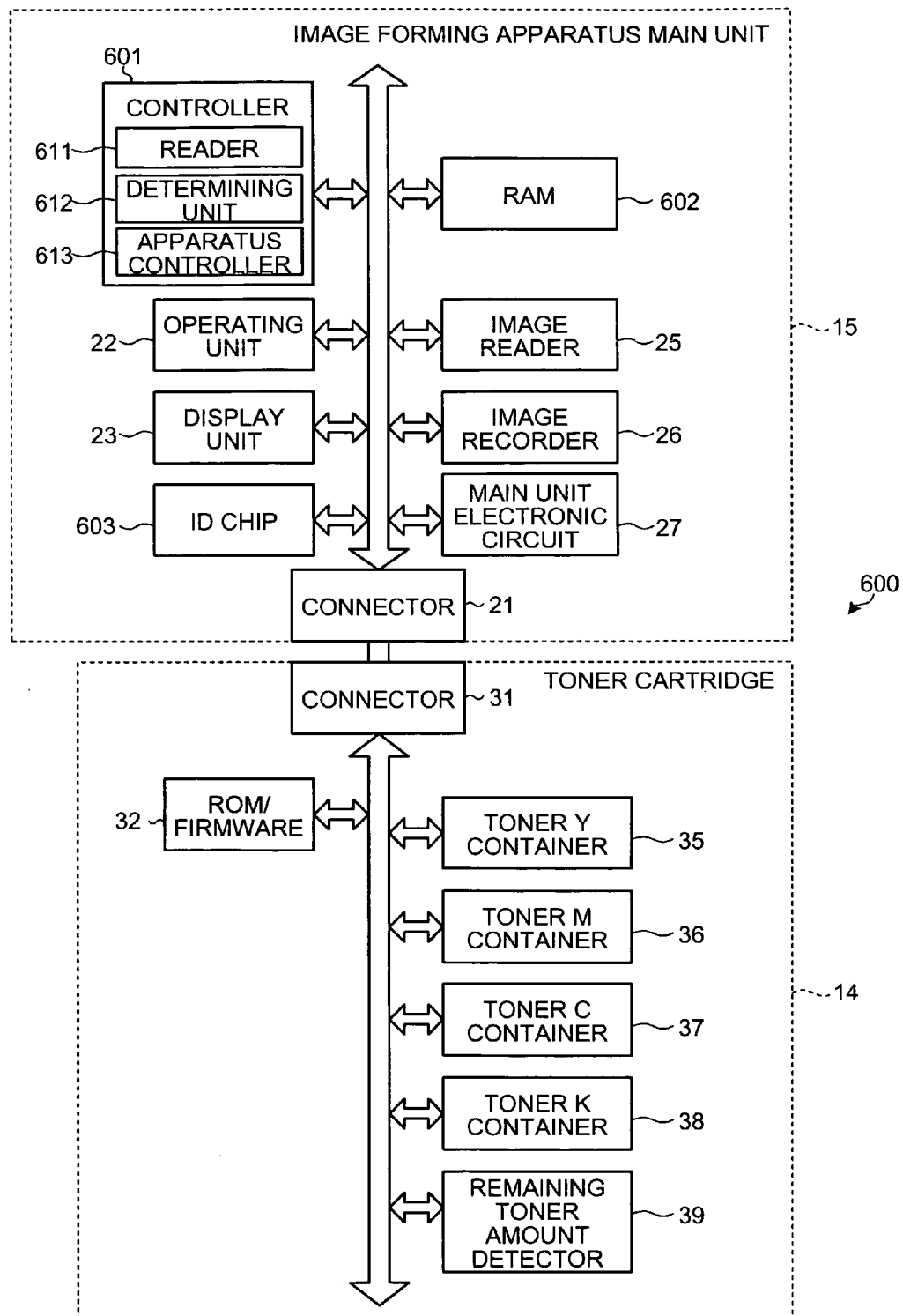
FIG. 6 is a block diagram of an image forming apparatus according to a third embodiment of the present invention.

FIG. 6 is a block diagram of an image forming apparatus according to the third embodiment. An image forming apparatus 600 includes an image forming apparatus main unit 15, and a toner cartridge 14 that contains toners of four colors and is attachable to the image forming apparatus main unit 15. The same reference numerals have been attached to the structural elements in the first embodiment and the third embodiment that perform the same or similar functions or have the same or similar structure.

The toner cartridge 14 differs from the toner cartridge 11 according to the first embodiment in that the RAM 33 and the controller 34 are omitted.

The image forming apparatus main unit 15 differs from the image forming apparatus main unit 12 according to the first embodiment in that a controller 601 and a RAM 602 are added, and the ID chip 24 is changed to an ID chip 603 that stores information different from the information stored in the ID chip 24.

The ID chip 603 stores information to identify the image forming apparatus main unit 15. The ID chip 603 holds a main unit ID to identify the image forming apparatus main unit 15. The main unit ID includes information that specifies the type of the image forming apparatus main unit 15. The ROM 32, like that of the first embodiment, holds a table representing the correlation between information that specifies the types and device-type dependent units of the firmware.

The RAM 602 stores various kinds of information specific to the image forming apparatus 600 and optimal set values or the like in the image forming apparatus main unit 15. The RAM 602 is also used as a memory area needed when the controller 601 executes predetermined operations.

The controller 601 includes a CPU (not shown). When the toner cartridge 14 is connected to the image forming apparatus main unit 15, the controller 601 controls the image forming apparatus main unit 15 by executing the firmware stored in the ROM 32 of the toner cartridge 14.

Specifically, when the toner cartridge 14 is connected, the controller 601 determines whether the firmware stored in the ROM 32 is executable by referring to the firmware. When having determined that the firmware is executable, the controller 601 executes the firmware common unit 201 stored in the ROM 32.

Since the controller 601 executes the firmware common unit 201, the controller 601 realizes the configuration that includes a reader 611, a determining unit 612, and an apparatus controller 613. By further executing a device-type dependent unit of the firmware, the controller 601 can control each section of the image forming apparatus 600 to execute predetermined operations.

The reader 611 reads the main unit ID from the ID chip 603. Based on the main unit ID read by the reader 611, the determining unit 612 determines whether the image forming apparatus main unit 15 is controllable when a device-type dependent unit of the firmware stored in the ROM 32 is executed.

In the third embodiment, the determining unit 612 determines whether a device-type dependent unit of the firmware that corresponds to the type of the image forming apparatus that is specified by the main unit ID is stored in the ROM 32 by referring to the table information stored in the ROM 32.

When having determined that such a device-type dependent unit of the firmware is stored in the ROM 32, the determining unit 612 determines that the image forming apparatus main unit 15 is controllable as the device-type dependent unit of the firmware is executed.

When the determining unit 612 determines that a device-type dependent unit of the firmware that corresponds to the type ID, the apparatus controller 613 executes the device-type dependent unit of the firmware. The apparatus controller 613 then controls the image forming apparatus main unit 15 with the executed firmware.

Figure 7:
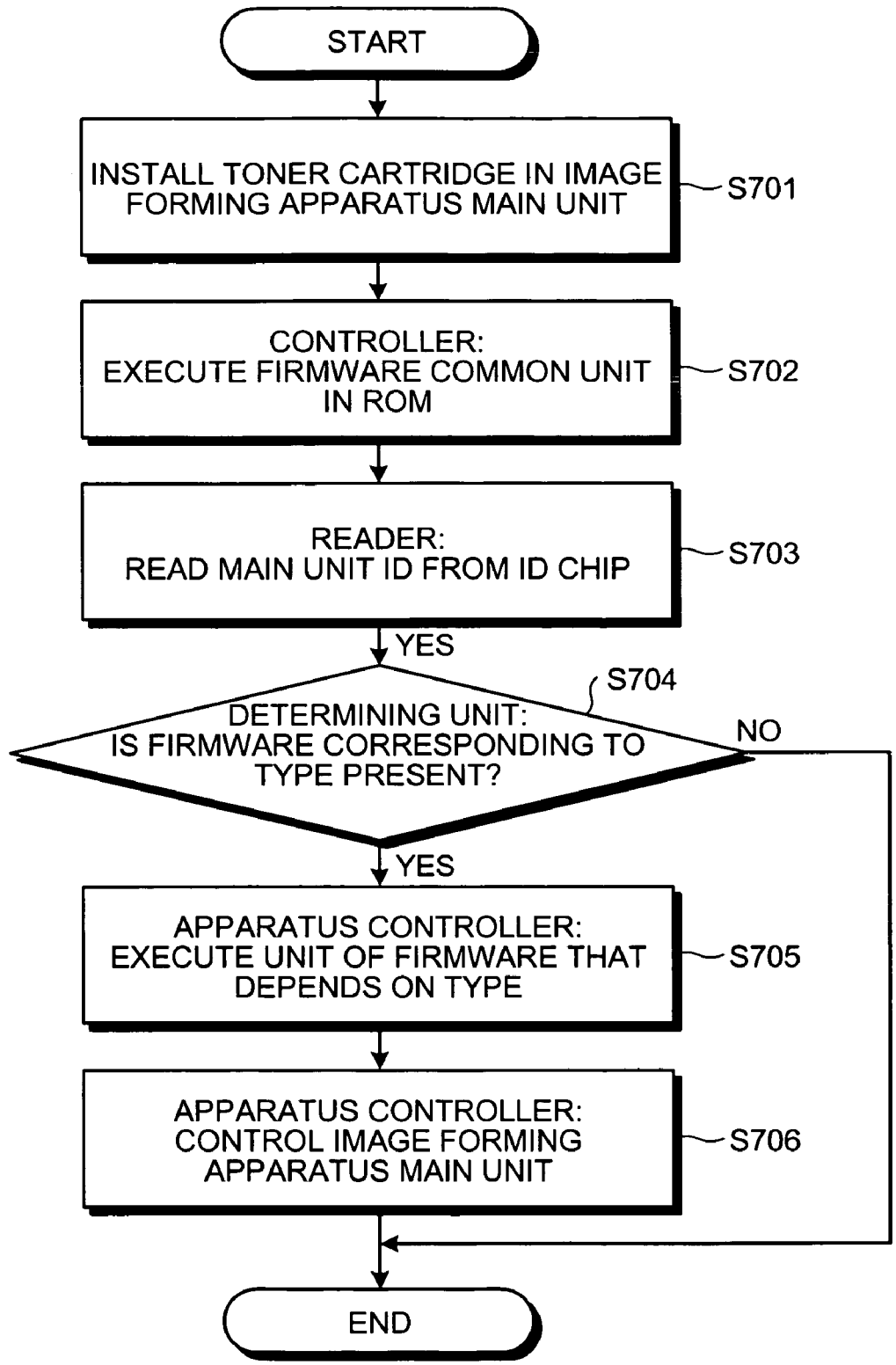
FIG. 7 is a flowchart of a processing procedure for explaining connection of the toner cartridge to the image forming apparatus according to the second embodiment to execution of control of a main unit of the image forming apparatus.

The following will describe a process from connection of the toner cartridge 14 of the image forming apparatus 600 to the image forming apparatus main unit 15 by the user to execution of control of the image forming apparatus main unit 15. FIG. 7 is a flowchart of the process procedures of the image forming apparatus 600.

First, the firmware common unit 201 is executed like steps S401 and S402 in FIG. 4 of the first embodiment (steps S701 and S702). Although not shown, the controller 601 needs to check if the firmware common unit 201 stored in the ROM 32 of the toner cartridge 14 is executable before executing the firmware common unit 201. When having determined that the firmware common unit 201 is not executable, the controller 601 terminates the process.

The reader 611 reads the main unit ID from the ID chip 603 (step S703).

The determining unit 612 determines whether a device-type dependent unit of the firmware that corresponds to the type specified by the main unit ID is present in the ROM 32 in the toner cartridge 14 by referring to the table information in the ROM 32 (step S704). When having determined that no device-type dependent unit of the firmware that corresponds to the type is present in the ROM 32 (step S704: No), the determining unit 612 determines that the image forming apparatus main unit 15 is not controllable with the firmware stored in the toner cartridge 14, and terminates the process.

When the determining unit 612 determines that a device-type dependent unit of the firmware that corresponds to the type is present in the ROM 32 (step S704: Yes), the apparatus controller 613 executes the device-type dependent unit of the firmware that depends on the type, and controls the image forming apparatus main unit 15 like steps S406 and S407 (steps S705 and S706).

Through the process procedures, the image forming apparatus main unit 15 can be controlled with the firmware stored in the ROM 32 in the toner cartridge 14.

Even when the controller 601 is provided in the image forming apparatus main unit 15, effects and advantages similar to that of the first embodiment can be acquired. In the toner cartridge 14 according to the third embodiment, the controller 601 and the RAM 602 are arranged in the image forming apparatus 600. This results in cost reduction and simplification of manufacturing process.

A fourth embodiment of the present invention relates to an ink cartridge connectable to the main unit of the image forming apparatus.

Figure 8:
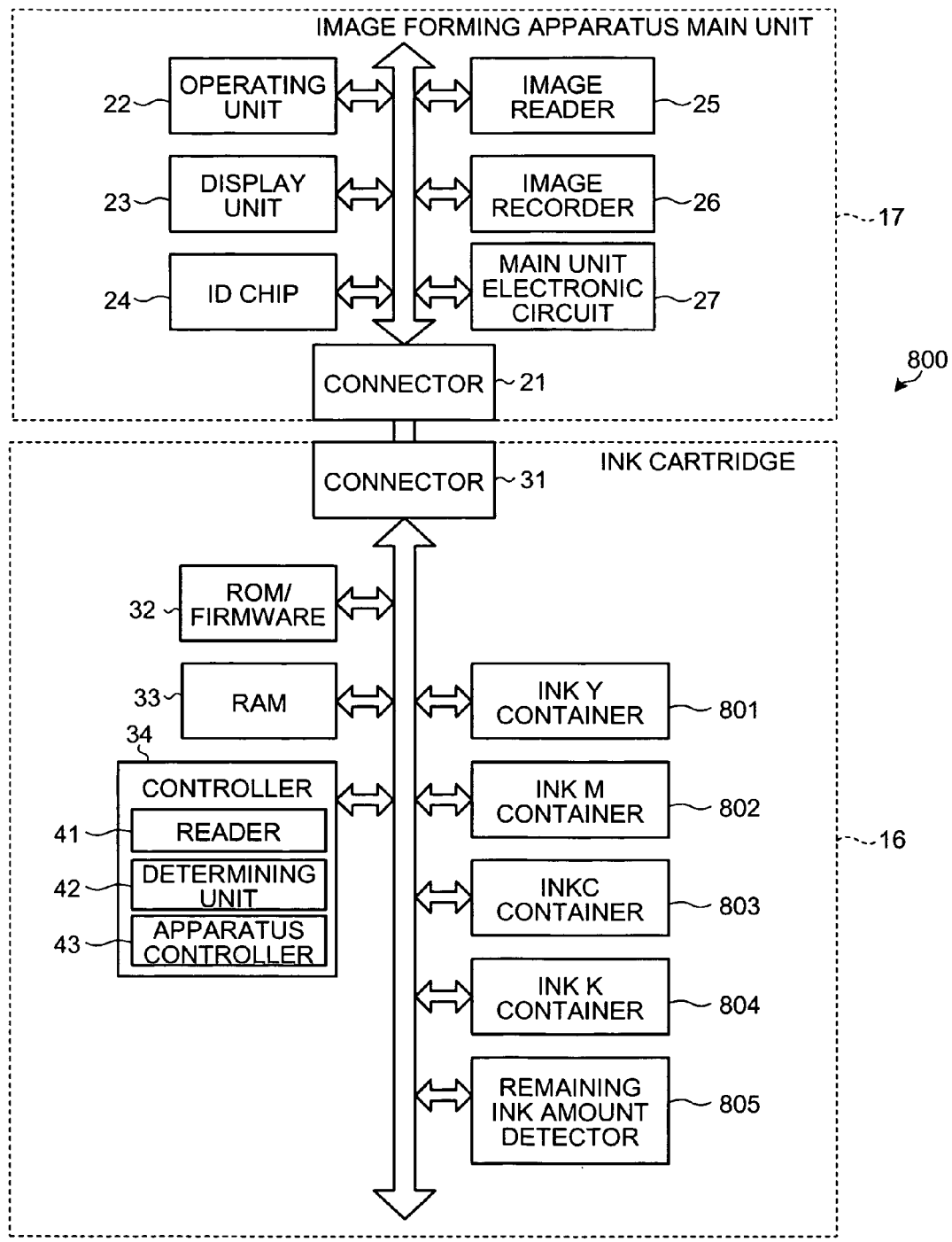
FIG. 8 is a block diagram of an image forming apparatus according to a fourth embodiment of the present invention.

FIG. 8 is a block diagram of an image forming apparatus according to the fourth embodiment. An image forming apparatus 800 includes an image forming apparatus main unit 17, and an ink cartridge 16 that contains toners of four colors and is attachable to the image forming apparatus main unit 17.

The same reference numerals have been attached to the structural elements in the first embodiment and the fourth embodiment that perform the same or similar functions or have the same or similar structure.

The ink cartridge 16 differs from the toner cartridge 11 according to the first embodiment in that ink containers are provided instead of the toner containers.

The configuration of the image forming apparatus main unit 17 does not particularly differ from the configuration of the image forming apparatus main unit 12 according to the first embodiment, but differs therefrom only in that what is connected to the image forming apparatus main unit is changed to the ink cartridge 16 from the toner cartridge 11.

An ink Y container 801 contains a yellow ink, and the container is replaced when the ink is finished. An ink M container 802 contains a magenta ink, and the container is replaced when the ink is finished. An ink C container 803 contains a cyan ink, and the container is replaced when the ink is finished. An ink K container 804 contains a black ink, and the container is replaced when the ink is finished. A remaining ink amount detector 805 detects the amount of ink remaining in each ink container color by color.

According to the forth embodiment, the ink cartridge to be connected to the common main unit of the image forming apparatus, the image forming apparatus can be realized with different functional specifications. This can be achieved by providing a difference in the operation program (e.g., firmware) in the ROM 32, and differences in the capacities and the specifications of the ROM 32 and the RAM 33, ink cartridge by ink cartridge. The operation program can have a correlation with the types of inks contained, so that the operation program is changeable according to the difference in ink type.

For example, the number of ink containers can be changed, ink cartridge by ink cartridge. In this case, different operation programs are stored in ink cartridges that have different numbers of ink containers. The operation program performs appropriate image processing according to the number of ink containers provided in the ink cartridge.

The ROM 32, the RAM 33, and the controller 34 can be provided in any expendable item of the ink cartridge, such as an ink ribbon cartridge.

Although the controller 34 and the RAM 33 have been provided in the ink cartridge, the controller 34 and the RAM 33 can be provided in the main unit of the image forming apparatus 800 as in the second embodiment.

The ink cartridge has containers containing inks of respective colors. To replace an ink, the container containing that ink has only to be replaced with the ink cartridge remaining unchanged, which is economical.

Since inks can be replaced color by color, a color ink that is finished has only to be replaced, which is economical.

Since there is the unit that detects the amounts of inks of each color, it is possible to know which color ink is becoming less.

When there is a color ink that is becoming less, the user is notified of it, and can therefore know which color ink is becoming less.

When there is a color ink that is becoming less, a service provider is notified of it, and replenishment of the color ink is appropriately performed by the service provider.

Since the apparatus unit is an ink cartridge, and the expendable item is an ink, the image forming apparatus can be upgraded to the latest version or the functions can be upgraded when the ink cartridge is replaced due to the ink being finished.

Even when the ink cartridge 16 is connected to the image forming apparatus main unit 17, the same effects and advantages as that of the first embodiment can be acquired.

A fifth embodiment of the present invention relates to a case that the main unit of an electronic apparatus is connected to an apparatus unit attachable to the main unit of the electronic apparatus.

Figure 9:
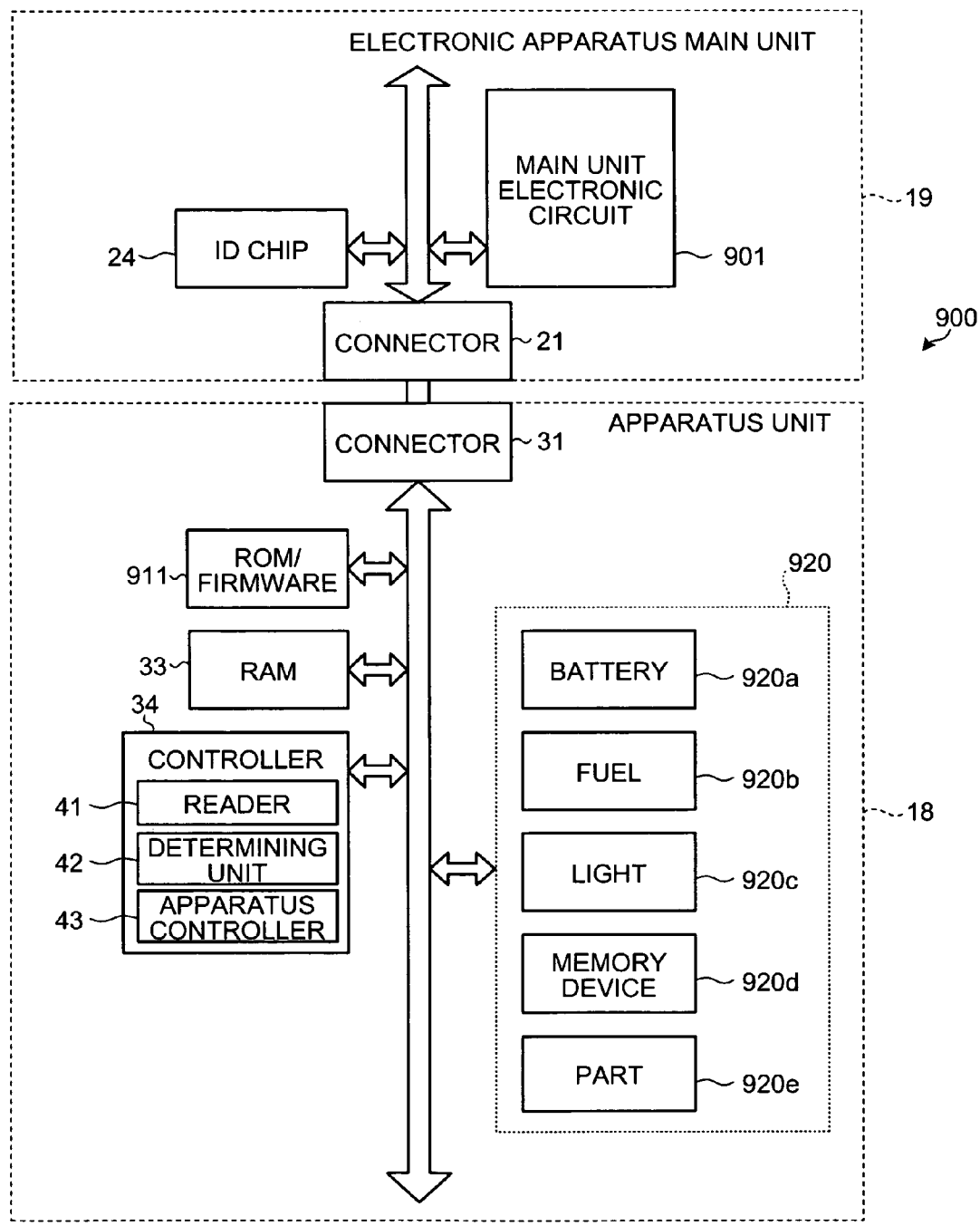
FIG. 9 is a configuration block diagram of an electronic apparatus according to a fifth embodiment of the present invention.

FIG. 9 is a block diagram of an electronic apparatus according to the fifth embodiment. An electronic apparatus 900 includes an electronic apparatus main unit 19, and an apparatus unit 18 that is attachable to the electronic apparatus main unit 19 and contains expendable items. The apparatus unit 18 further includes a memory storing the operation program of the electronic device. The same reference numerals have been attached to the structural elements in the first embodiment and the fifth embodiment that perform the same or similar functions or have the same or similar structure.

The electronic apparatus main unit 19 has the connector 21, the ID chip 24, and a main unit electronic circuit 901.

The main unit electronic circuit 901 is an auxiliary circuit for operating the electronic apparatus main unit 19. When a field programmable gate array (FPGA) is used in the main unit electronic circuit 901, the electronic circuit can be reprogrammed by the controller 34 in the apparatus unit 18.

The apparatus unit 18 and the electronic apparatus main unit 19 exchange information via buses connected by the connector 21 and the connector 31.

The apparatus unit 18 has the connector 31, a ROM 911, the RAM 33, the controller 34, and expendable items 920.

A computer program that operates the electronic apparatus 900 is stored in advance in the ROM 911. In the fifth embodiment, firmware that is used to control the electronic apparatus is stored as the program that operates the electronic apparatus 900. The ROM 911 can be expanded by memory extension or the like in the apparatus unit 18. The ROM 911 stores the operation program that is appropriate for each electronic apparatus to which the apparatus unit 18 is connected.

Any of the expendable items 920 is replaced by a user when it is consumed. The expendable items 920 include a battery 920a, fuel 920b, a light source 920c, a memory device 920d, and a part 920e. The battery 920a is used as a drive power source for the electronic device, and a back-up power source. The fuel 920b is used after being converted to the drive power. The light source 920c supplies light to the electronic device or an external unit. The memory device 920d records images and voices using a magnetic material, a semiconductor or the like. The part 920e is consumed or degraded particularly by usage or with the passage of the time.

The expendable items 920 does not need to include all of the battery 920a, the fuel 920b, the light source 920c, the memory device 920d, and the part 920e, but has only to include at least one of the items. The battery 920a, the fuel 920b, the light source 920c, the memory device 920d, and the part 920e are given as examples of the expendable items, and other expendable items can be included in the apparatus unit 18 as well.

The electronic apparatus 900 can be incorporated in various electronic devices. For example, in a recorder to which an HDD is attachable in an HDD-installed motion picture recording apparatus, firmware can be replaced together with the attachable HDD.

As another example, the electronic apparatus 900 can be adapted to a video camera to which a battery is attachable, so that firmware can be updated when the battery is replaced. Likewise, the electronic apparatus 900 can be adapted to a portable telephone to which a battery is attachable, so that firmware can be updated when the battery is replaced.

Since there is provided a unit that reprograms the circuit in the main unit of the electronic apparatus using the controller in the apparatus unit that is attachable to the main unit of the electronic apparatus and incorporates expendable items, the functional specifications of the electronic apparatus can be changed by the apparatus unit to be attached, and the cost of the main unit of the electronic apparatus can be reduced.

Since the expendable items incorporated in the apparatus unit include a battery, the electronic apparatus can be upgraded to the latest version or the functions can be upgraded by replacing the battery.

Since the expendable items incorporated in the apparatus unit include fuel, the electronic apparatus can be upgraded to the latest version or the functions can be upgraded by replacing the fuel.

Since the expendable items incorporated in the apparatus unit include a light source, the electronic apparatus can be upgraded to the latest version or the functions can be upgraded as the light source is replaced when the light source is out or degraded.

Since the expendable items incorporated in the apparatus unit include a memory device, the electronic apparatus can be upgraded to the latest version or the functions can be upgraded when the remaining memory capacity of the memory device becomes small.

Since the expendable items incorporated in the apparatus unit include a part, the electronic apparatus can be upgraded to the latest version or the functions can be upgraded when a part that is degraded by the amount of usage or with the passage of the time is replaced.

According to the present invention, as the replacement unit has an operation program that controls the electronic apparatus, replacement of the replacement unit changes the operation program. This can achieve an effect of easily updating the operation program of the electronic apparatus to an appropriate one.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic apparatus comprising:

an apparatus-side storage unit that stores therein identification information for identifying the electronic apparatus;

a connector connectable to a replacement unit the replacement unit having a unit-side storage unit that stores therein an operation program to control the electronic apparatus, and determination information that is a basis of determining whether the operation program can control the electronic apparatus based on the identification information stored in the apparatus-side storage unit;

a determining unit that determines, when the replacement unit is connected to the connector, whether the operation program in the unit-side storage unit can control the electronic apparatus based on the identification information stored in the apparatus-side storage unit and the determination information in the unit-side storage unit; and an apparatus controller that executes the operation program in the unit-side storage unit to control the electronic apparatus when the determining unit determines that the operation program can control the electronic apparatus;

wherein:

the identification information includes type information indicative of a type of the electronic apparatus, the determining unit determines based on the type information in the apparatus-side storage unit whether the operation program can control the electronic apparatus, the unit-side storage unit of the replacement unit stores therein a plurality of operation programs each corresponding to one type of the electronic apparatus, the determining unit determines based on the type information in the apparatus-side storage unit an operation program capable of controlling the electronic apparatus from the operation programs included in the unit-side storage unit, and the apparatus controller executes the operation program determined by the determining unit to control the electronic apparatus.

2. The electronic apparatus according to claim 1, further comprising:

a work information storage unit that stores therein data used to execute the operation program and a result of execution of the operation program.

3. A replacement unit comprising:

a connector connectable to an electronic apparatus, the electronic apparatus having an apparatus-side storage unit that stores therein identification information for identifying the electronic apparatus;

a unit-side storage unit that stores therein an operation program to control the electronic apparatus, and determination information that is a basis of determining whether the operation program can control the electronic apparatus based on the identification information stored in the apparatus-side storage unit;

a read processor that reads, when the electronic apparatus is connected to the connector, the identification information in the apparatus-side storage unit;

a determining unit that determines based on the identification information read by the read processor and the determination information stored in the unit-side storage unit whether the operation program in the unit-side storage unit can control the electronic apparatus; and an apparatus controller that executes the operation program in the unit-side storage unit to control the electronic apparatus when the determining unit determines that the operation program can control the electronic apparatus.

4. The replacement unit according to claim 3, further comprising:

a work information storage unit that stores therein data used to execute the operation program and result of execution of the operation program.

5. The replacement unit according to claim 3, wherein:

the identification information includes type information indicative of type of the electronic apparatus, and the determining unit determines based on the type information in the apparatus-side storage unit and the determination information in the unit-side storage unit whether the operation program can control the electronic apparatus.

6. The replacement unit according to claim 5, wherein:

the unit-side storage unit stores therein a plurality of operation programs each corresponding to one type of the electronic apparatus, and the determining unit determines based on the type information read by the read processor and the determination information in the unit-side storage unit an operation program capable of controlling the electronic apparatus from the operation programs stored in the unit-side storage unit.

7. The replacement unit according to claim 3, further comprising:

a receiving unit configured to receive information; and an update unit that updates the operation program in the unit-side storage unit based on information received by the receiving unit.

8. The replacement unit according to claim 3, further comprising an expendable-item incorporating unit that incorporates an expendable item to be used by the electronic apparatus.

9. A method of controlling an electronic apparatus with a replacement unit that can be detachably attached to the electronic apparatus, the electronic apparatus including an apparatus-side storage unit that stores therein identification information for identifying the electronic apparatus; and a first connector connectable to the replacement unit, and the replacement unit including a second connector connectable to the first connector of the electronic apparatus; and a unit-side storage unit that stores therein an operation program to control the electronic apparatus; and determination information that is a basis of determining whether the operation program can control the electronic apparatus based on the identification information stored in the apparatus-side storage unit, the method comprising:

reading the identification information from the apparatus-side storage unit;

determining based on read identification information and the determination information in the unit-side storage unit whether the operation program in the unit-side storage unit can control the electronic apparatus; and executing the operation program in the unit-side storage unit when it is determined at the determining that the operation program can control the electronic apparatus.

* * * * *